(12) United States Patent
Kraatz

(10) Patent No.: US 7,895,897 B2
(45) Date of Patent: Mar. 1, 2011

(54) SENSOR ASSEMBLY AND USE OF A SENSOR ASSEMBLY

(75) Inventor: Alexander Kraatz, Burgstadt (DE)

(73) Assignee: WIKA Alexander Wiegand GmbH & Co. KG, Klingenberg/Main (DE)

( * ) Notice: Subject to any disclaimer, the term of this patent is extended or adjusted under 35 U.S.C. 154(b) by 142 days.

(21) Appl. No.: 12/041,282

(22) Filed: Mar. 3, 2008

(65) Prior Publication Data

US 2009/0217766 A1     Sep. 3, 2009

(51) Int. Cl.
*G01L 9/00* (2006.01)
(52) U.S. Cl. ....................................... 73/723
(58) Field of Classification Search ............... None
See application file for complete search history.

(56) References Cited

U.S. PATENT DOCUMENTS

| | | | | |
|---|---|---|---|---|
| 3,113,460 | A | * | 12/1963 | Wrenn ........................ 73/744 |
| 4,884,175 | A | * | 11/1989 | Weng ......................... 362/119 |
| 5,113,695 | A | * | 5/1992 | Huang ....................... 73/146.8 |
| 7,036,383 | B2 | * | 5/2006 | Imai et al. ..................... 73/754 |
| 7,555,959 | B2 | * | 7/2009 | Miyasaka .................... 73/732 |
| 2005/0103111 | A1 | | 5/2005 | Imai et al. |

FOREIGN PATENT DOCUMENTS

| | | |
|---|---|---|
| DE | 102004049899 A1 | 6/2005 |
| JP | 2006105645 A | 4/2006 |

* cited by examiner

*Primary Examiner*—Lisa M Caputo
*Assistant Examiner*—Jermaine Jenkins
(74) *Attorney, Agent, or Firm*—Baker & Hostetler LLP

(57) ABSTRACT

A sensor assembly consists of a metallic pressure sensor cap welded to a tubular gland, which integrally forms a sealing edge on its one end opposing the pressure sensor cap side, a housing part, which has an opening formed therein such that the gland can penetrate the same, and a gland nut being turnably supported on a projecting portion of the gland for attaching the sealing edge to a process port. A stepped portion of the sensor cap is welded to a stepped portion of the gland, and the housing part is fixed to the outside surface of the gland in a position between the sensor cap and the sealing edge. Here, the sensor cap has an outer diameter, which is smaller than or equal to an outer diameter of the gland, so that the sensor cap being welded to the gland beforehand can be fitted into the opening of the housing part.

12 Claims, 3 Drawing Sheets

SENSOR ASSEMBLY AND USE OF A SENSOR ASSEMBLY

BACKGROUND OF THE INVENTION

The present invention relates to a sensor assembly as well as to the use of the sensor assembly as an ultra high purity sensor assembly.

DESCRIPTION OF THE RELATED ART

In order to measure a fluid pressure, JP-Nr. 2006-105645 provides a pressure sensor, as can be seen in FIGS. 3A and 3B. The pressure sensor is constituted by a stem 1 with a diaphragm 2 formed on top, a cylindrical housing 3 which surrounds the stem 1, a sensor chip 4 for converting the amount of distortion of the diaphragm 2 and a processing circuit chip 5 for processing an electric signal from the sensor chip 4 for providing an output to the outside. Here, the stem 1 is a hollow cylindrical element comprising an open end opposite to the diaphragm 2 which is formed on the stem 1 by lapping the closed end of the stem 1 to an adequate thin diaphragm thickness. In order to connect the stem 1 to a process pressure to be measured, the open end of the stem 1 can be welded directly to a stem carrier 6 (see. FIG. 3A), or, as shown in another embodiment (see FIG. 3B), the stem 1 can comprise an external thread 7 for screwing the stem 1 into a corresponding process port 8. Thereby, the process pressure to be measured can be introduced directly to the diaphragm 2, and the resulting deformation of the diaphragm 2 can be converted into an electric signal by the sensor chip 4.

However, the process of lapping as it is commonly used is high in costs and requires a lot of time and work. Thus, a cheaper and facilitated way to process the sensor membrane (diaphragm) is needed.

Another sensor assembly already in use by the applicant shows a gland nut provided turnably on one end of a gland, which gland nut and gland are standard parts according to VCR-Swagelok®-specifications (the combination of gland and gland nut is hereinafter designated as "gland-and-nut-system"). The other end of the gland is welded to an intermediate member, such as a housing or the like, in such a way, that an inner through-hole of the gland corresponds to a through-hole in the intermediate member. On the other side of the intermediate member opposite to the gland, a sensor cap is welded to the housing part afterwards, so that an inner bore of the sensor cap corresponds to the through-hole in the intermediate member. The thus constructed sensor assembly can be connected to a corresponding connection portion provided in a process by means of the above mentioned gland-and-nut-system. Thus, the pressure to be measured can be introduced to the inside of the sensor cap, thereby deforming a thin film sensor membrane welded to the sensor cap. This deformation can be measured by a measuring unit on the outside of the sensor cap and the measuring results can be converted into digital information by the measuring unit.

In the above known sensor assembly, a problem occurs during the assembling process in that the gland has to be welded to the housing part while the gland nut is already placed on the gland. Thereby, handling of the gland with the loose gland nut provided thereon complicates the welding process for a worker in that the gland nut can suddenly move along and rotate around the gland due to handling of the gland during welding, thus making an exact welding process difficult. Moreover, as the intermediate member usually is a hollow housing, a welding of the cap to the inside of the housing is difficult to manage for a worker, as the shape of the housing can be a cylindrical shape with a small inner diameter, thereby reducing a working space required for handling a welding tool.

Furthermore, as both the sensor cap and the gland have to be welded to the intermediate member, thermal stress can be produced in all welded portions which can lead to a warping of, for example, the sensor membrane, resulting in measurement failures. Also, as welding has to be performed on both sides of the housing, wherein usually only a small working space exists for handling the welding tools, a damage of the sensor membrane can occur easily due to welding sparks or debris caused by the welding process.

SUMMARY OF THE INVENTION

It is the object of the present invention to provide an improved sensor assembly, wherein the problems of the above discussed prior art can be prevented.

This object is achieved with a sensor assembly having the features of claim 1. Here, the sensor assembly for measuring the pressure of a fluid substantially consists of a tubular gland, a pressure sensor cap and a gland nut being turnably supported on the outside surface of the gland.

Preferably, one end of the gland integrally forms both a protruding portion for turnably supporting the gland nut on the gland and a sealing edge for enabling the gland to be tightly connectable to a process port of a process to be measured. The sealing edge preferably exhibits a sealing geometry in conformity with VCR-Swagelok®-requirements.

The gland nut has a through-hole formed therein and is arranged on the gland in such a way that the gland penetrates the gland nut, wherein one end side surface of the gland nut abuts against the protruding support portion. For connecting the gland-and-nut-system to the process port, an external thread is formed on the one circumferential part of the gland nut, which is adjacent to its one end side abutting against the support portion. With this particular gland-and-nut-system, it is possible to fit the gland into the process port and orientate the gland as desired, i.e. rotate the gland as desired, before tightening the screw joint connection between the gland and the process port. On the remaining part of the gland nut other than the threaded part, handling surfaces are formed thereon for handling the gland nut with a handling tool, such as a wrench or the like.

According to the invention, the gland and the gland nut of the gland-and-nut-system are standard parts after VCR-Swagelok®-standards. As a result, the sensor assembly of the invention can be used in combination with a standardised process port.

The sensor cap comprises a metallic thin film sensor or the like, which is connected to a deformation sensitive structure such as resistors arranged in a Wheatstone bridge in order to measure a deformation of the sensor.

The sensor preferably comprises a metallic membrane, which can be attached to the sensor cap by welding, soldering, pressing, etc. It is also conceivable to process a full-body sensor cap by grinding, lapping, laser-cutting and the like in a way so that the pressure measuring side of the sensor cap reaches a thin dimension comparable to a membrane.

Here, the sensor cap is welded to the other end of the gland before being finally assembled. Thus, enough room for welding is available, which facilitates a handling during welding and makes it easier to protect the sensor membrane against any kind of damage caused by the welding process, such as welding sparks and the like.

Also, in order to keep the influence of a welding process on the sensor membrane as small as possible, stepped portions are formed on the gland and the sensor cap, respectively, so that both stepped portions form one single recess after being welded together. With this recess, thermal stress, forces generated in welding or the like can be decoupled. Thus, the assembly exhibits high thermal compensation ability. Alternatively, the stepped portions can be omitted, or a different kind of force decoupling mechanism can be applied, such as several particularly arranged recesses or the like. Also, the sensor cap can be fixed to the gland by soldering, bonding or any other kind of attachment process.

After welding the sensor cap to the gland, the sensor cap is inserted into an opening of an intermediate member, for example a housing part, so that the sensor cap is placed inside the housing part in such a way that it is accessible for exerting a wiring operation, and subsequently, the gland and the housing are fixed together by welding or the like. Here, the sensor cap of the invention has a largest outer diameter equal to or smaller than the outer diameter of the one part of the gland which is to be inserted into the opening of the housing part.

In dimensioning the outer diameter of the sensor cap with the same size or smaller than the outer diameter of the gland, a welding of the sensor cap to the gland can be performed without arranging the gland nut on the gland beforehand. Thus, the welding of the sensor cap to the gland is significantly facilitated, thereby facilitating the entire assembling process.

Preferably, an inner wall of the gland, which is in contact with the fluid to be measured, can be surface polished or the like.

Furthermore, the housing part can be made of metal and can be formed in a substantially cylindrical shape. Here handling portions can be provided on the outside of the housing part for facilitating a handling of the housing part during a welding process, an assembling process or the like.

The sensor assembly can further include a two wire cabling for outputting a signal of 4-20 mA, which is preferably generated by a power consumption lower than 4 mA.

BRIEF DESCRIPTION OF THE DRAWINGS

This invention will be explained by means of preferred embodiments using the attached drawing figures, in which.

DESCRIPTION OF EMBODIMENTS

Figure 1:
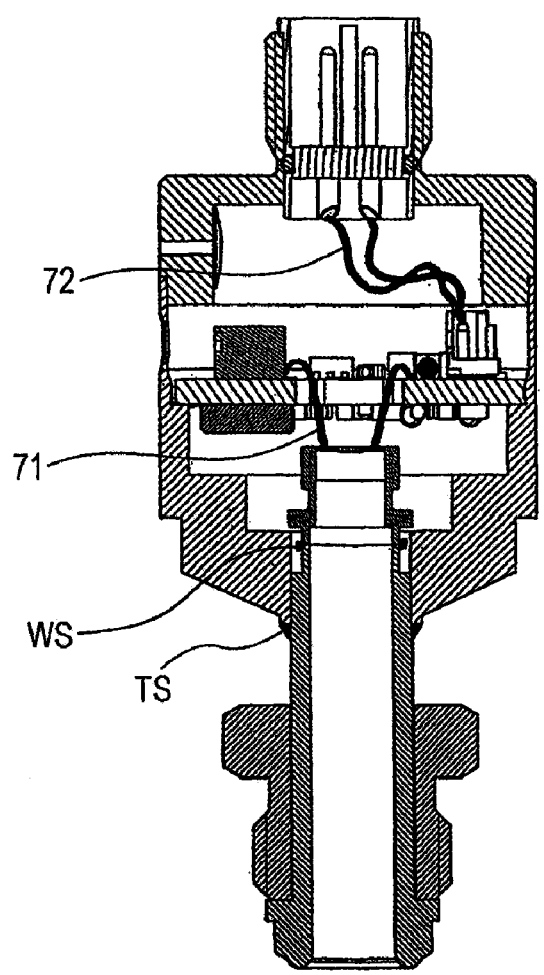
FIG. 1 is a sectional view showing the assembled sensor assembly.
Figure 2:
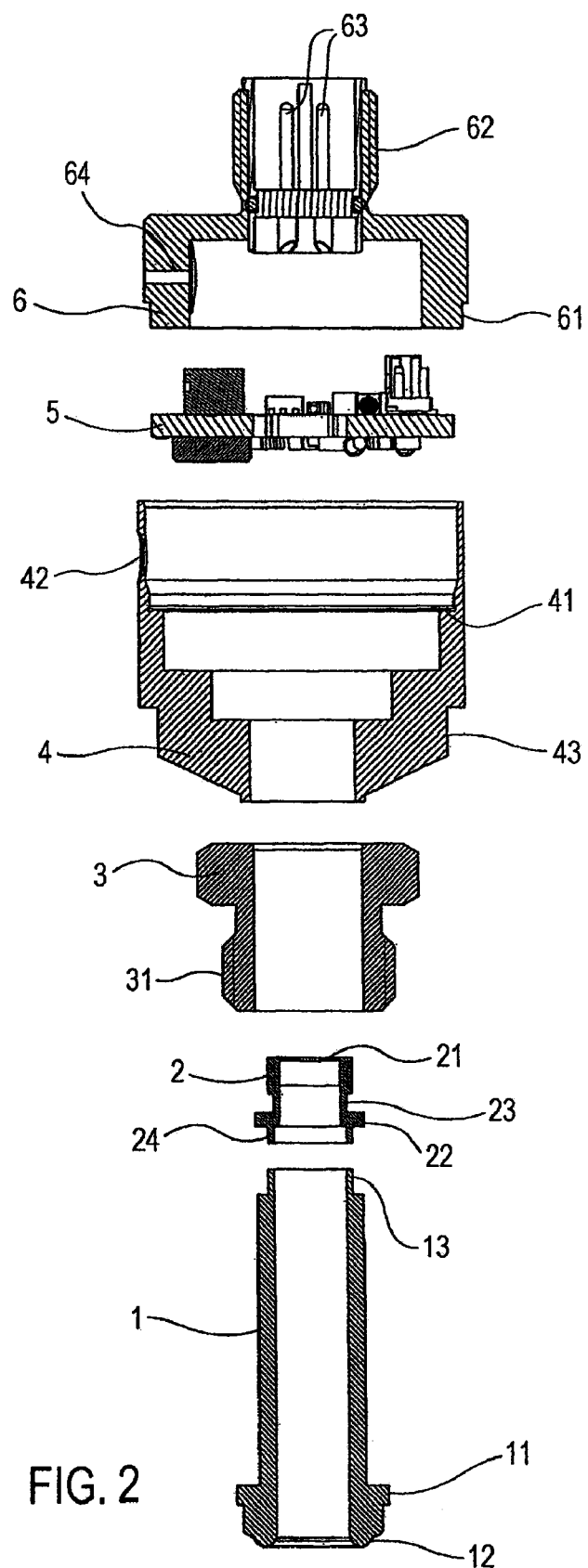
FIG. 2 is an exploded sectional view of the sensor assembly of FIG. 1.
Figure 3A:
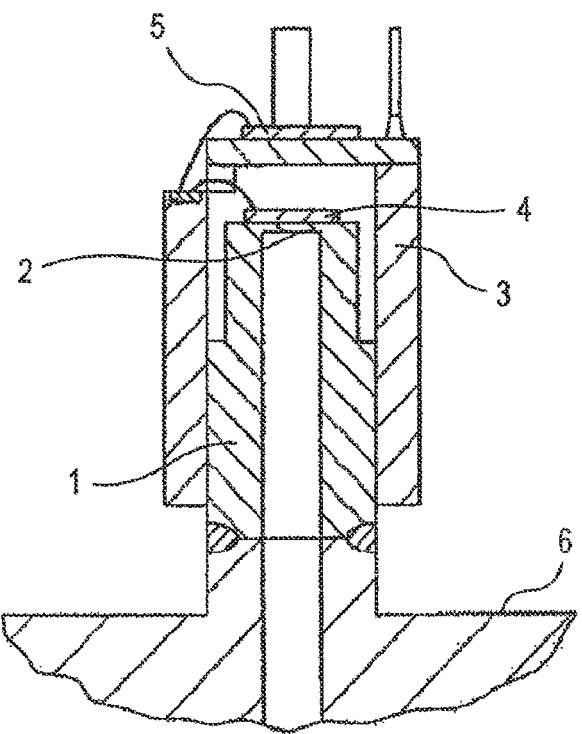
FIGS. 3A and 3B are comparative examples according to prior art.
Figure 3B:
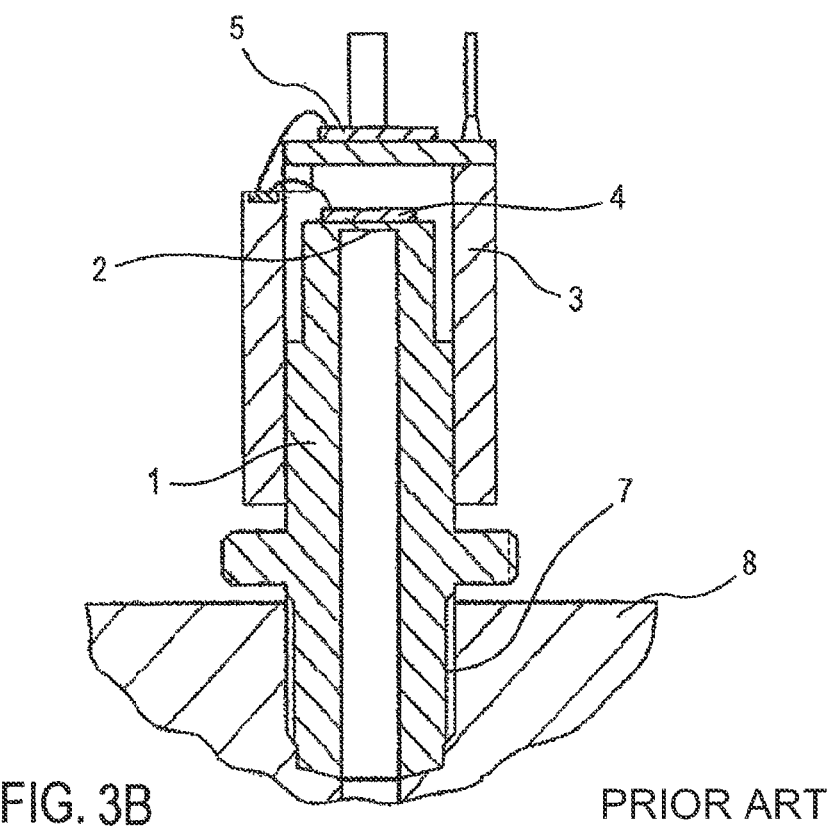

In one embodiment of the invention, as can be seen in FIGS. 1 and 2, a gland 1, which has a through hole formed therein in a longitudinal direction serving as an inside passage has formed a sealing edge 12 on its one end. On this one end, adjacent to the sealing edge 12, a gland nut support portion 11 protrudes radially outward from the gland's main body, the outer diameter of which is larger than the outer diameter of both the sealing edge 12 and the main body of the gland 1. The gland nut support portion 11 supporting a gland nut 3 in an abutting state has the purpose of pressing the sealing edge 12 against a corresponding part (not shown) by connecting the gland nut 3 to the corresponding part. On the other end of the gland 1 opposing the above mentioned one end of the gland 1, a step or stepped portion 13 is formed in such a way that a wall thickness of the gland 1 at this particular stepped portion 13 is thinned out significantly. The diameter of the through hole in this embodiment at the stepped portion 13 is kept constant, but it is conceivable that the stepped portion 13 is alternatively formed as a recess on the inside of the gland 1, so that the diameter of the through hole is increased. The through hole is preferably surface polished improving ultra high purity (UHP) gas applications, but can also be surface-treated with coating or the like in order to achieve desired inside surface properties if needed.

In the present embodiment, a sensor cap 2 is attached to the stepped portion 13 of the gland 1 by welding before the sensor assembly is assembled, as can be seen by a welding seam WS in FIG. 1. The welding seam WS in FIG. 1 is overacted for clearness of arrangement. Usually, the welding seam WS is ground or polished away afterwards. Alternatively, as the application, the sensor cap 2 may also be attached to the gland 1 by means of soldering, gluing or the like.

Here, the one edge of the sensor cap 2 to be attached to the stepped portion 13 of the gland 1 forms a stepped portion 24 having inner and outer diameters similar to the stepped portion 13 of the gland 1, such that the stepped portions 13, 24 are in accordance with each other. Thus, a preferably gapless connection can be achieved, which is particularly preferable on the inside of the thus achieved combination of the gland and the sensor cap for the sake of cleanness.

The other end of the sensor cap 2 comprises a metallic thin film sensor preferably constituted by a metallic membrane 21 with a circular shape in a radial direction of the sensor cap 2. Alternatively, the metallic membrane 21 can have different shapes, such as a polygonal shape and the like. Preferably, the membrane 21 is made from a plate-like metal sheet processed to exhibit the dimensional requirements of a membrane, namely an overly thinner dimension in an axial direction compared to its radial dimension. In this embodiment, the membrane 21 is attached to one open end of the sensor cap 2 by welding the circumferential edge of the membrane 21 to the one end of the sensor cap 2. Alternatively, the membrane 21 can be attached to the gland 1 by another equivalent joining technique, such as soldering and the like. Thus, the one end of the sensor cap 2 is tightly closed by attaching the thin film sensor thereto, so that pressure applied to the inside of the sensor cap 2 cannot escape and acts on the one side of the membrane 21 on the inside of the sensor cap 2.

On the other side of the membrane 21, a deformation sensitive structure is connected to the membrane 21 in such a way that deformations of the membrane 21 caused by the pressure applied thereto can be received. This deformation of the membrane 21 is converted into an electric signal. The deformation sensitive structure in this embodiment is constituted by resistors arranged in a Wheatstone bridge. Alternatively, other structures such as a piezo-resistive structure, a thin film resistor or the like can be used.

The sensor cap 2 further comprises a projecting portion 22 adjacent to the stepped portion 24, and a groove portion 23 between the projecting portion 22 and the other end of the sensor cap 2. With this particular arrangement of the projecting portion 22 between the groove portion 23 and the stepped portion 24, it is possible to decouple external forces, forces applied in welding as well as thermal stress. These forces arise mainly in the welded parts and can be absorbed by the projecting portion 22. Particularly in view of thermal stress, the thinner regions, i.e. the stepped portion 24 and the groove portion 23 provide an improved cooling ability, and the projecting portion 22 provides a improved ability of absorbing forces generated by thermal stress and the like. Thus, the combination of the sensor cap 2 and the gland 1 shows thermal compensation ability, particularly around the part where the gland 1 and the sensor cap 2 are welded together.

Since the largest outer diameter of the combination of the gland and the sensor cap is smaller than a through hole of the gland nut 3, it is possible to arrange a gland nut 3 on the gland 1 after the sensor cap 2 and the gland 1 have been welded together. Thus, compared to prior art, a welding of the sensor cap 2 to the gland 1 can be done more easily without having a loose gland nut 3 arranged on the gland 1.

Here, the gland nut 3 and the gland 1 are elements according to VCR-Swagelok®-standards. One end of the gland nut 3 abuts on the gland nut support portion 11 of the gland 1, so that the gland nut 3 is supported in a position close to the sealing edge 12 of the gland nut 3. Thus, in connecting the gland nut 3 to its counter part, e.g. a process port (not shown) connected to the process to be measured, a VCR-Swagelok® connection is established.

With this particular arrangement, it is possible to easily orientate the sensor assembly in a desired way before tightly connecting the gland nut 3 to the process port, e.g. the gland can be rotated as desired around its longitudinal axis. This can be of particular interest when an existing or prescribed equipment harness it to be attached or if a display is to be mounted to the sensor head.

For establishing the above effect, the gland nut 3 preferably comprises an external thread 31 for screwing the gland nut 3 into the corresponding process port. Alternatively, it is also conceivable that the gland nut 3 has an internal thread formed therein in order to screw the nut 3 on a counter part comprising an external thread.

In connecting the gland nut 3 to the process port, the sealing edge 12 is pressed against a corresponding sealing contour (not shown) of the process port, thereby tightly sealing the connection between the gland 1 and the process port.

After placing the gland nut 3 on the gland 1, an intermediate member such as a cylindrical housing part 4 can be attached to the gland 1 by welding. Thereby, the housing part 4 is fixed to the outside surface of the gland 1 in a position between the sensor cap 2 and the sealing edge 12, i.e. in a position between the stepped portion 13 and the projecting portion 11, as can be seen by a throat seam TS in FIG. 1. In this embodiment, the sensor cap 2 is placed inside the cylindrical housing part 4. Here, the housing part 4 has several inner portions with different diameters formed therein, providing several steps which can be used for the support of devices to be connected to the metallic thin film sensor in the housing part 4. In particular, the step with the largest diameter (referred to as measuring unit support portion 41) is used for supporting a measuring unit 5. On the support portion 41, the measuring unit 5 is pressfitted into the housing part 4 after the measuring unit 5 has been connected to the thin film sensor, i.e. the deformation sensitive structure of the sensor cap 2 by means of a wiring 71.

The cylindrical housing part 4 provides handling portions 43 on its outside circumference for holding and handling the housing part 4, for example during a welding process and the like, with a corresponding tool or jig.

After placing the measuring unit 5 on the inside of the housing part 4, a terminal 62 included in a housing cover 6 is connected to the measuring unit 5 by another wiring 72. Then, the housing cover 6 is pressfitted into the housing part 4. Here, a fitting portion 61 in form of a stepped portion is used for fitting the housing cover 6 into the housing part 4. The terminal 62 of the housing cover 6 comprises several connector pins 63 which can be used to connect electronics to the measuring unit 5 for converting and outputting a measuring signal from the thin film sensor 21, which indicates the pressure of the fluid flowing inside the gland 1. This measuring signal may be transmitted to a data processor and the like, or a display can be directly placed on the terminal 62, which shows the measured pressure. Furthermore, in the present embodiment, a lateral bore 64 is provided for equalizing pressure between the inside of the housing and the surrounding area.

In this embodiment, in order to adjust or calibrate the measuring unit 5, an adjustment hole 42 is preferably provided in the housing part 4, so that a screw driver, a custom made adjustment tool or the like can be introduced into the housing part 4 after the sensor assembly has been assembled as illustrated in FIG. 1.

INDUSTRIAL APPLICABILITY

The sensor assembly produced in the above way is preferably employed for measuring ultra high purity (UHP) gas in an ultra high purity gas process but can also be used for any other kind of fluid pressure measuring.

This invention is not limited to the embodiment as described above but can also be applied to various embodiments within the scope of the invention as it is carried out in the accompanying claims.

A sensor assembly consists of a metallic pressure sensor cap welded to a tubular gland, which integrally forms a sealing edge on its one end opposing the pressure sensor cap side, a housing part, which has an opening formed therein such that the gland can penetrate the same, and a gland nut being turnably supported on a projecting portion of the gland for attaching the sealing edge to a process port. A stepped portion of the sensor cap is welded to a stepped portion of the gland, and the housing part is fixed to the outside surface of the gland in a position between the sensor cap and the sealing edge. Here, the sensor cap has an outer diameter, which is smaller than or equal to an outer diameter of the gland, so that the sensor cap being welded to the gland beforehand can be fitted into the opening of the housing part.

The invention claimed is:

1. A pressure sensor assembly, particularly for the use with ultra high purity gas, comprising:
    a metallic pressure sensor cap (2),
    a tubular gland (1) integrally forming a sealing edge (12) on its one end opposing the pressure sensor cap (2) side,
    a housing part (4) penetrated by said gland (1), and
    a gland nut (3) being turnably supported on the outside surface of the gland (1) for attaching the sealing edge (12) to a process port,
    wherein said sensor cap (2) is welded directly to the gland (1),
    said housing part (4) is fixed to the outside surface of said gland (1) between the sensor cap (2) and the sealing edge (12), and
    said sensor cap (2) has an outer diameter being smaller than or equal to an outer diameter of the gland (1).

2. A pressure sensor assembly according to claim 1, wherein the sensor cap (2) comprises a metallic thin-film sensor connected with a deformation sensitive structure.

3. A pressure sensor assembly according to claim 2, wherein said thin-film sensor comprises a metallic membrane (21).

4. A pressure sensor assembly according to claim 1, wherein an inside passage of the gland (1) is surface polished.

5. A pressure sensor assembly claim 1, wherein the housing part (4) is made of metal and is formed in a substantially cylindrical shape.

6. A pressure sensor assembly according to claim 5, wherein handling portions (43) are formed on the outside of the housing part (4).

7. A pressure sensor assembly according to claim 1, wherein said housing part (4) is welded to the gland (1).

8. A pressure sensor assembly according to claim 1, wherein another end of the gland (1) forms a circumferential step (13).

9. A pressure sensor assembly according to claim 1, wherein the assembly shows thermal compensation ability.

10. A pressure sensor assembly according to claim 1, wherein the assembly includes a two-wire cabling (71, 72) outputting a signal of 4-20 mA, preferably together with a power consumption lower than 4 mA.

11. A pressure sensor assembly according to claim 1, characterized in that the sealing edge (12) has a sealing geometry according to VCR-Swagelok®-standards.

12. Use of a pressure sensor assembly according to any one of claims 1 to 11 as an ultra high purity (UHP) sensor assembly.

* * * * *